United States Patent
Carmen, Jr. et al.

(10) Patent No.: US 10,480,388 B2
(45) Date of Patent: Nov. 19, 2019

(54) LIQUID COOLED RADIAL POWER PLANT HAVING AN EXTERNAL COOLANT MANIFOLD

(71) Applicant: UniGen Power Inc., Auburn Hills, MI (US)

(72) Inventors: Anthony Joseph Carmen, Jr., Bloomfield Hills, MI (US); Nicholas Anthony Salvatore, Shelby Township, MI (US)

(73) Assignee: UNIGEN POWER INC., Auburn Hills, MI (US)

( * ) Notice: Subject to any disclaimer, the term of this patent is extended or adjusted under 35 U.S.C. 154(b) by 0 days.

(21) Appl. No.: 15/259,940

(22) Filed: Sep. 8, 2016

(65) Prior Publication Data
US 2018/0066565 A1   Mar. 8, 2018

(51) Int. Cl.
| | |
|---|---|
| F02P 3/02 | (2006.01) |
| F01P 3/02 | (2006.01) |
| H02K 7/18 | (2006.01) |
| F01P 11/04 | (2006.01) |
| F02F 1/10 | (2006.01) |
| F02F 1/16 | (2006.01) |
| H02K 19/16 | (2006.01) |
| H02K 9/19 | (2006.01) |
| F02B 63/04 | (2006.01) |
| F01B 1/06 | (2006.01) |
| F02B 75/22 | (2006.01) |
| H02K 5/24 | (2006.01) |

(52) U.S. Cl.
CPC .............. *F01P 3/02* (2013.01); *F01B 1/062* (2013.01); *F01P 11/04* (2013.01); *F02B 63/048* (2013.01); *F02B 75/222* (2013.01); *F02F 1/10* (2013.01); *F02F 1/102* (2013.01); *F02F 1/166* (2013.01); *H02K 7/1815* (2013.01); *H02K 9/19* (2013.01); *H02K 19/16* (2013.01); *F01P 2003/021* (2013.01); *H02K 5/24* (2013.01)

(58) Field of Classification Search
CPC ..... F01P 3/02; F01P 11/04; F01F 1/10; H02K 7/1815; F02B 75/22; F02B 63/04
See application file for complete search history.

(56) References Cited

U.S. PATENT DOCUMENTS

| | | |
|---|---|---|
| 2,186,784 A | 1/1940 | Furay |
| 2,316,160 A | 4/1943 | Goby |
| (Continued) | | |

OTHER PUBLICATIONS

International Search Report, PCT/US17/50451, dated Jan. 11, 2018; 4pgs.

(Continued)

*Primary Examiner* — Sean Gugger
(74) *Attorney, Agent, or Firm* — Jennings, Strouss and Salmon, PLC; Michael K. Kelly; Daniel R. Pote (57) ABSTRACT

Methods and systems for cooling a radial engine in a ground-based portable electric power generating system. The engine includes a plurality of cylinders extending radially from a central hub supporting a crankshaft. Each cylinder has a coolant inlet port and a coolant outlet port. The cooling system includes an inlet coolant manifold interconnecting at least two of the coolant inlet ports. The inlet coolant manifold is disposed external to the central hub.

8 Claims, 12 Drawing Sheets

(56) References Cited

U.S. PATENT DOCUMENTS

| | | | | |
|---|---|---|---|---|
| 5,058,535 | A * | 10/1991 | Wilkinson | F01P 3/02 123/41.28 |
| 5,150,668 | A * | 9/1992 | Bock | F02F 1/10 123/41.8 |
| 5,333,575 | A * | 8/1994 | Olmr | F01P 3/02 123/41.42 |
| 5,386,805 | A | 2/1995 | Shizou et al. | |
| 5,937,802 | A * | 8/1999 | Bethel | F01P 3/02 123/41.08 |
| 6,622,667 | B1 * | 9/2003 | Doers | F01P 7/165 123/41.1 |
| 8,567,354 | B2 | 10/2013 | Kealy et al. | |
| 2002/0170510 | A1 | 11/2002 | Yoshiaki Iizuka | |
| 2007/0056552 | A1 * | 3/2007 | Fisher | F01B 9/023 123/197.4 |
| 2007/0272466 | A1 * | 11/2007 | Levey | B62M 7/02 180/219 |
| 2009/0007878 | A1 * | 1/2009 | Korenjak | F01L 1/022 123/193.5 |
| 2009/0235878 | A1 * | 9/2009 | Kitamura | F01P 3/02 123/41.44 |
| 2010/0072757 | A1 * | 3/2010 | Kealy | F01N 13/04 290/1 A |
| 2011/0146601 | A1 * | 6/2011 | Fisher | F01B 9/047 123/62 |
| 2012/0167844 | A1 * | 7/2012 | Palazzolo | F01M 11/02 123/54.4 |
| 2012/0240892 | A1 * | 9/2012 | Carmen | F01B 1/062 123/196 AB |
| 2014/0048253 | A1 | 2/2014 | Andreychk | |
| 2015/0204285 | A1 * | 7/2015 | Gruschow | F02M 35/10288 123/41.01 |
| 2015/0260079 | A1 * | 9/2015 | Youm | F01P 3/02 123/41.74 |

OTHER PUBLICATIONS

Written Opinion, PCT/US17/50451, dated Jan. 11, 2018; 6 pgs.
International Preliminary Report on Patentability; The International Bureau of WIPO, dated Mar. 2019, 8pgs.

* cited by examiner

LIQUID COOLED RADIAL POWER PLANT HAVING AN EXTERNAL COOLANT MANIFOLD

TECHNICAL FIELD

The present invention relates, generally, to a fluid cooled radial engine for use in a ground-based electric power generator system and, more particularly, to a coolant system for a radial engine having a coolant manifold which is external to the engine housing.

BACKGROUND

The high combustion temperature of an internal combustion engine requires the heat to be removed to prevent damage to the pistons and cylinders. Indeed, with lighter weight aluminum heads (as opposed to heavier cast iron), the head material could melt without adequate cooling. In addition, excessive temperatures can break down oil, so that it does not perform its lubricating function. It is thus imperative to reject heat from an internal combustion engine, either through air cooling or fluid cooling (typically water combined with a chemical coolant additive).

Aircraft engines typically employ air cooling rather than water cooling due to the abundance of ram air and the extra weight occasioned by the radiator, water pump, coolant, reservoir, and other fluid cooling system hardware. For these reasons, radial engines were developed in order to leverage the available ram air.

In limited applications, such as the P-51 Mustang by Allison-Packard and certain Rolls Royce V-12 aircraft engines, water cooling was employed where a radial configuration was deemed to compromise aerodynamics. But those engines were configured as in-line blocks, which are not suitable for air cooling in the way radial engines are. For example, in a radial engine each cylinder is directly exposed to cooling air flow, whereas in an in-line engine (V-8, V-12) only the most forward facing cylinder is directly exposed to the ram air flow. For this reason, radial engine configurations have been used in aircraft.

There have also been a limited number of liquid cooled radial engines proposed for flight environments, such as the Wright Tornado R-2160 42 cylinder radial engine and the BMW 803 28 cylinder four row radial engine. However, all presently known known water cooled radial engines have been limited to aircraft (non-ground based) flight applications.

Kealy et al. U.S. Pat. No. 8,567,354, the entire disclosure of which is hereby incorporated herein, proposes an air cooled radial engine for use in a ground-based, portable energy generation system. The Kealy radial engine configuration employs air cooling, but is limited in its ability to reject heat in a ground based system at high ambient temperatures, especially at the exhaust valve ports. In addition, the large fan (e.g., 60 inches in diameter) required to move the cooling air (e.g., 22,000 cubic feet per minute (CFM)) created high ambient noise, which can be problematic in urban areas which may impose noise restrictions.

Systems and methods are thus needed which provide the horsepower-to-weight ratio available from a radial engine in a ground-based power generation system, but which avoid the limitations of air cooled systems.

Various features and characteristics will also become apparent from the subsequent detailed description and the appended claims, taken in conjunction with the accompanying drawings and this background section.

BRIEF SUMMARY

Various embodiments of the present invention relate to systems and methods for, inter alia: i) a ground-based, water (fluid) cooled radial engine useful for power generation; ii) a liquid (e.g., water) cooling system for a radial engine including cast iron or other metallic cylinder heads; iii) a ground-based radial engine design for use in a portable electric power generator yielding peak horsepower output at about 2300 revolutions per minute (RPM); iv) a radial engine including a plurality of cylinder extensions extending from a central hub, including fluid conduits for porting coolant to and from each cylinder, where the fluid conduits are disposed external to the central hub; v) a radial engine including a plurality of cylinder extensions extending from a central hub, where each cylinder includes a water jacket surrounding the cylinder bore and defining a coolant path therebetween; and vi) a radial engine including a plurality of cylinder extensions extending from a central hub where the sleeve includes a flange configured to allow a head to secure the sleeve to the outside of the hub.

Various other embodiments, aspects, and features are described in greater detail below.

BRIEF DESCRIPTION OF THE DRAWING FIGURES

Exemplary embodiments will hereinafter be described in conjunction with the following drawing figures, wherein like numerals denote like elements, and.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Various embodiments of the present invention relate to a water cooled radial engine for ground based use, for example, to drive an electric power generator.

The primary function of an engine block is to support the crankshaft, and to provide a path for the piston to reciprocate and the connecting rods to connect the pistons to the crank shaft. In an in-line engine, the block also contains the channels or conduits for supplying coolant to and from the area water jackets surrounding the cylinder bore and/or cylinder head (sometimes referred to as water jackets). That is, the coolant paths which bring fluid into and out of the cooling jackets are integral to the engine block itself, as opposed to being routed outside of the block. In a radial engine, however, the cylinder bores are separated in space, such that there is no "block" material interconnecting adjacent cylinders. Consequently, in the present invention, the conduits which feed coolant to and remove coolant from the jackets surrounding the cylinders and/or heads are not integral with the crank shaft housing (also referred to herein as the central hub or the power case), and are preferably external to the central hub.

In accordance with a further aspect of the present invention, each cylinder extension from the central hub includes a fluid inlet port and a fluid outlet port, where at least one of the fluid inlet ports is connected to a fluid inlet manifold, and at least one of the fluid outlet ports is directly connected to a fluid outlet manifold. The inlet and outlet manifolds may comprise solid or flexible metal tubes, with solid or flexible connections to the inlet and outlet ports. An external water pump driven by the crankshaft via a gearbox is also provided.

Figure 1:
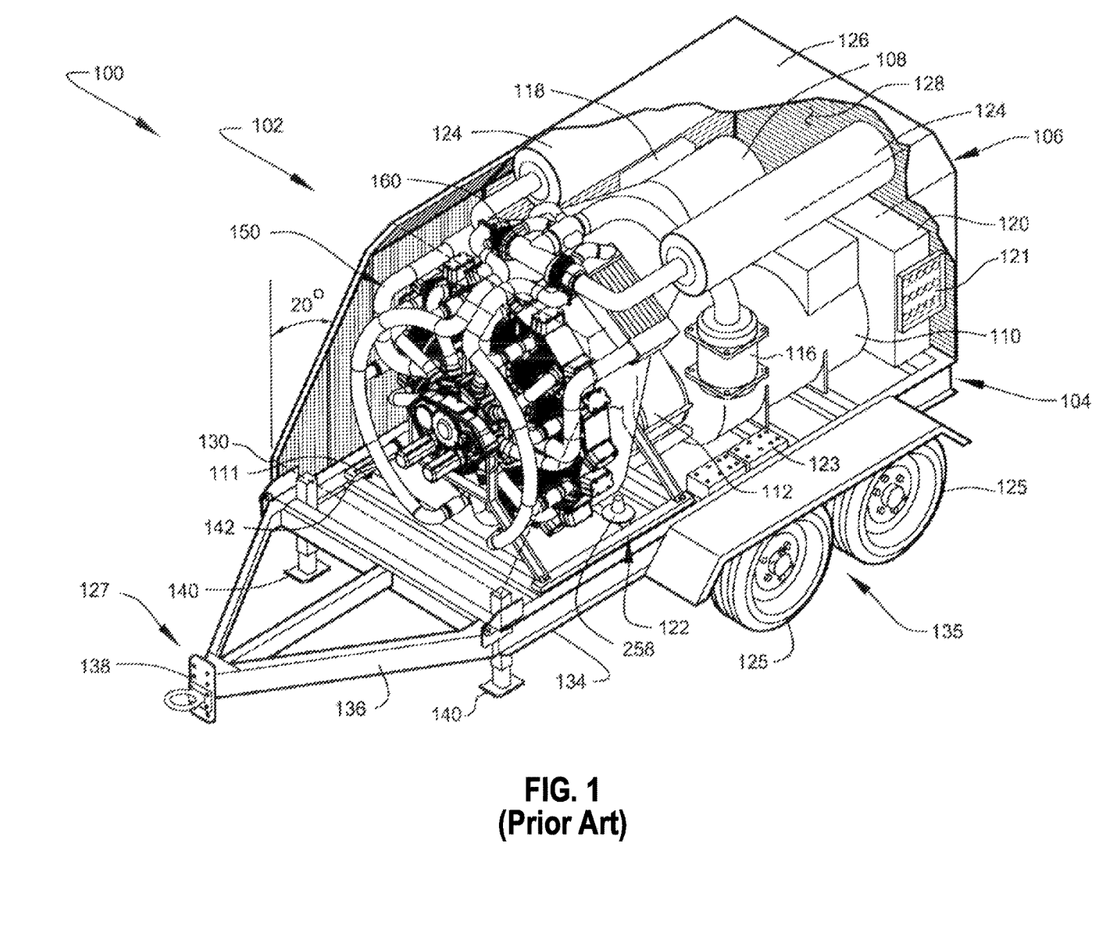
FIG. 1 is a schematic perspective view, in partial section, of a lightweight and compact mobile generator system in accordance with various embodiments.
Figure 2:
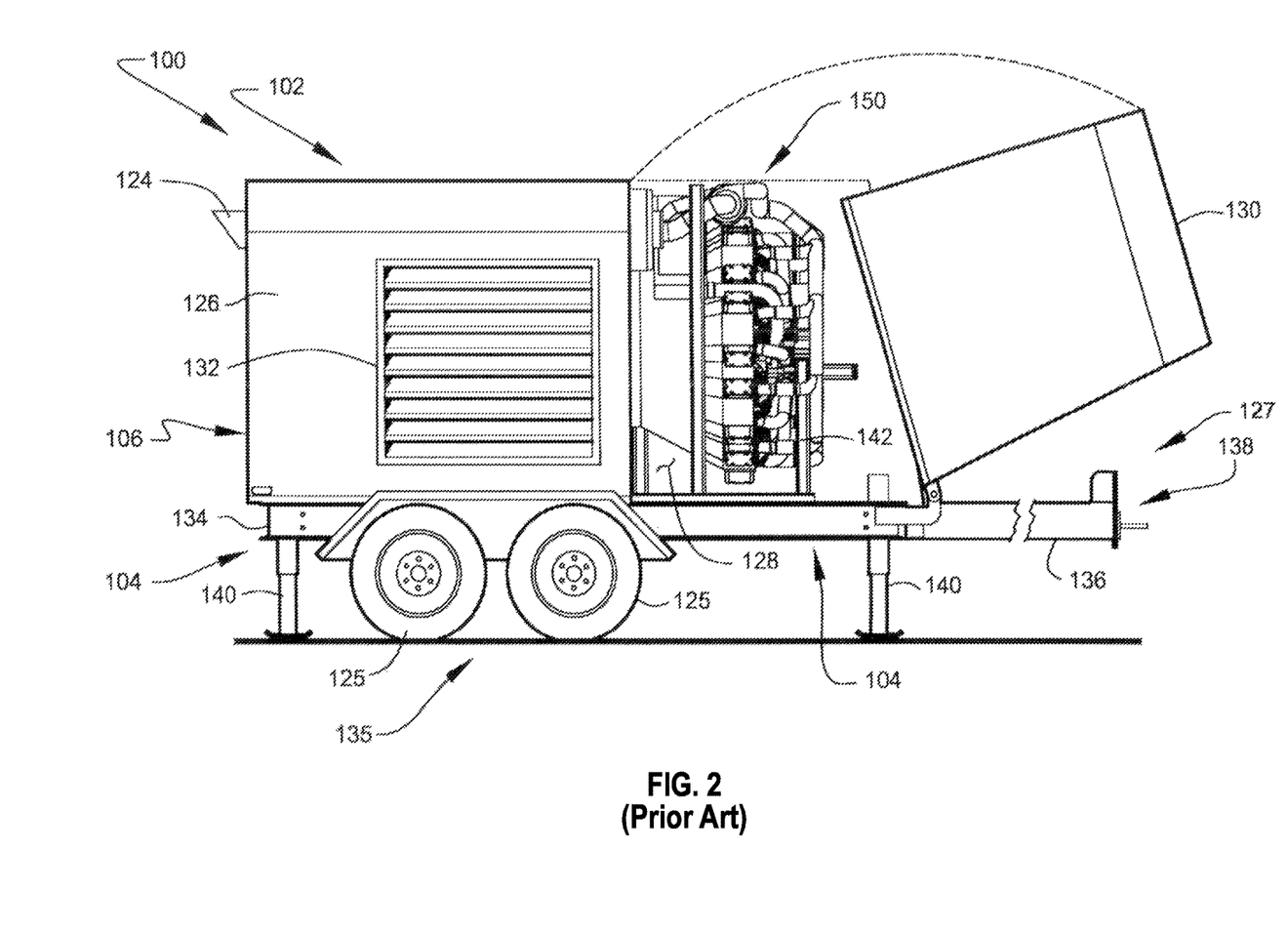
FIG. 2 is a side elevation view of the mobile generator system of FIG. 1 with an outer housing of the mobile generator set arranged in an open configuration in accordance with various embodiments.

FIG. 1 shows a perspective view, in partial section, of a highly compact mobile generator set 102 capable of producing electrical power at megawatt output levels, according to a preferred embodiment of the present invention. For clarity of description, a portion of outer enclosure 106 of mobile generator set 102 has been omitted from the illustration of FIG. 1 to better depict the preferred internal arrangements of the apparatus. FIG. 2 shows a side view of the same mobile generator set 102 with a forward portion of outer enclosure 106 arranged to an open configuration.

The preferred embodiments of portable energy generation system 100, including generator set 102 described herein, preferably comprise high-output electrical generators exhibiting the preferred physical characteristics of compact size, low weight, the ability to use a wide range of conventional fuels, and superior operational reliability. During developmental testing, using industry-standard test conditions, preferred embodiments of portable energy generation system 100 produced a sustained three-phase 60-Hertz output of one megawatt, from a unit having a physical size about one-half that of conventional diesel or natural gas-powered generators of similar capacity.

Generator set 102 preferably comprises at least one prime mover, preferably at least an internal combustion engine, most preferably a highly-compact and power-dense internal combustion engine identified herein as radial power-generation unit 150. Radial power-generation unit 150 preferably comprises a piston-driven engine structured and arranged to produce at least one output of rotary power from the combustion of at least one liquid or gaseous fuel. In a preferred arrangement of the apparatus, the rotary power output of radial power-generation unit 150 is operationally coupled with at least one electrical generator 110, as shown. The unexpectedly high power density of generator set 102 is principally enabled by the selection and use of a powerful but compact radial-type power plant, in combination with a compactly-organized arrangement of supporting system components, as further described below.

Radial power-generation unit 150, electrical generator 110, and the supporting operational components of generator set 102 are preferably housed within outer enclosure 106, preferably providing both weather protection and sound attenuation. Radial power-generation unit 150 is preferably arranged directly forward of electrical generator 110, as shown. The remaining generator components, such as, for example, electrical control subsystem 120, fan ducting 108, torque-transmission unit 112, air cleaner 116, oil filtration subsystem 118, fuel-delivery components 122, batteries 123, and exhaust silencers 124 are preferably positioned in a compact arrangement around radial power-generation unit 150 and electrical generator 110, as shown.

The preferred configuration of radial power-generation unit 150 comprises a high power-to-weight ratio. Thus, utilization of radial power-generation unit 150 as the prime mover of generator set 102 preferably reduces the overall weight of the apparatus. The preferred low weight and compact size of generator set 102 permits the unit to be supported on towable trailer chassis 104 (at least embodying herein at least one wheeled chassis), thus forming the preferred embodiment of FIG. 1.

Outer enclosure 106 is preferably constructed using a plurality of substantially weather-resistant outer panels 126 preferably secured to an underlying framework of supporting members 107, preferably comprising a welded assembly of tube and angular steel structured and arranged to rigidly mount outer enclosure 106 to towable trailer chassis 104 (at least embodying herein at least one mount structured and arranged to mount such outer housing to such at least one wheeled chassis). Outer panels 126 preferably comprise at least one weather-resistant material, most preferably lightweight sheet metal. Under appropriate circumstances, considering issues such as cost, intended use, etc., other material arrangements such as, for example, fiberglass-reinforced panels, molded polymers, etc., may suffice.

Towable trailer chassis 104 preferably comprises a rigid structural frame 134 adapted to provide a supportive mounting structure for outer enclosure 106 and the electrical generation apparatus contained therein. Structural frame 134 preferably comprises a principal assembly of 8-inch deep I-shaped steel members preferably supporting a plurality of rigid cross members. The rolling components of towable trailer chassis 104 preferably comprises dual tandem axles 135 mounted to structural steel frame 134 using a conventional leaf-spring suspension, as shown. The dual tandem axles 135 preferably comprise a braking axle of about 8000 pound capacity in combination with either a second braking axle or idler axle both of about 8000 pound capacity. Each axle is fitted with a set of road wheels 125 preferably comprising rubber pneumatic tires, as shown.

Structural frame 134 preferably comprises at least one hitch assembly 127 structured and arranged to couple towable trailer chassis 104 to a towing vehicle. Hitch assembly 127 preferably comprises an A-frame tongue 136 extending from the forward end of structural frame 134, as shown. Tongue 136 preferably supports at least one hitch device, most preferably a 4-bolt, multi-position pintle-type hitch 138, as shown. Pintle-type hitch 138 preferably comprises at least one height-adjustable lunette eye, as shown, attachable to a pintle hook of the towing vehicle. Upon reading this specification, those with ordinary skill in the art will now appreciate that, under appropriate circumstances, considering such issues as cost, type of towing vehicle, regional regulations, etc., other hitch arrangements such as, for example, gooseneck 5th-wheel hitches, ball hitches, etc., may suffice.

Four ground-engaging drop leg jacks 140 are preferably mounted at each corner of structural frame 134 to support and stabilize towable trailer chassis 104 when disengaged from the towing vehicle. Each drop leg jack 140 comprises a telescoping assembly operated by mechanical, hydraulic, or electric means. In addition towable trailer chassis 104 is preferably equipped with all U.S. Department of Transportation (DOT) required equipment, preferably including tail lights, brake lights, side marker lights, turn signals, side and rear reflectors, etc. Upon reading this specification, those with ordinary skill in the art will now appreciate that, under appropriate circumstances, considering such issues as regional regulations, insurance requirements, etc., the employment of other towing-related equipment such as, for example, breakaway switches, provisions for safety chains, backup signals, etc., may suffice.

External access to the internal volume 128 of outer enclosure 106 is preferably provided by an arrangement of access doors, preferably including a large pivoting forward section 130 structured and arranged to provide full inspection and service access to radial power-generation unit 150. Air circulation through outer enclosure 106 is preferably facilitated by a set of vents 132 located within outer panels 126.

Preferably, an electrical load is coupled to the output of mobile generator set 102 at an externally-accessible distribution panel 121, as shown in FIG. 1. Distribution panel 121 preferably comprises three banks of three-phase receptacles, preferably protected by breakers, preferably rated up to 600 VAC at 400 amperes continuous service. Distribution panel 121 preferably comprises a NEMA-approved housing containing three "POSI-LOK" EO400 series sequential interlock panels supplied by Couse-Hinds of LaGrange, N.C.

Figures 3, 4:
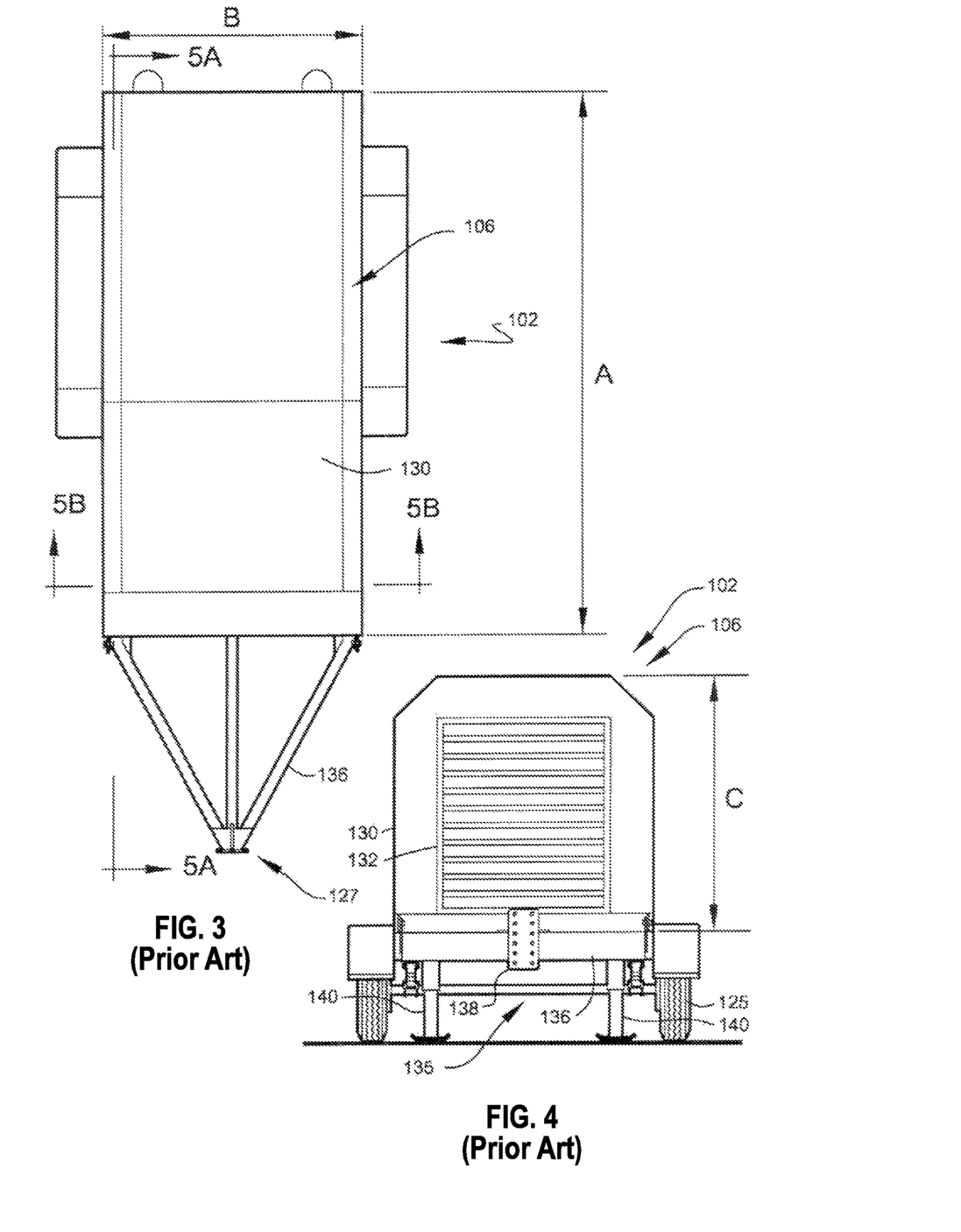
FIG. 3 is a schematic top view of the mobile generator system of FIG. 1 in accordance with various embodiments.
FIG. 4 is a front elevation view of the mobile generator system of FIG. 1 in accordance with various embodiments.
Figure 15:
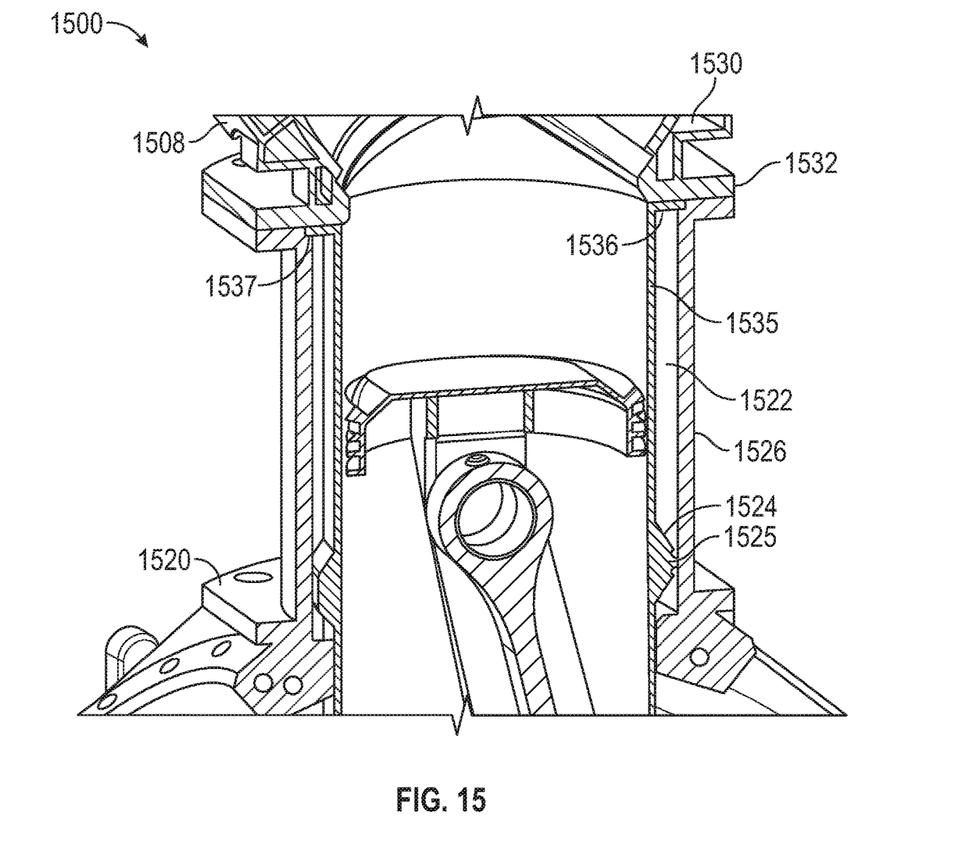
FIG. 15 is a close up view of the inside of the cylinder of FIG. 14, illustrating the flanged sleeve held in place by the cylinder head in accordance with various embodiments.

Outer enclosure 106 preferably comprises an overall length A of about 4 meters (13 feet) and an overall width B of about 2.1 meters (seven feet) as best illustrated in top view of FIG. 3. FIG. 4 shows a dimensioned front view of mobile generator set 102 illustrating the preferred enclosure height C of about two meters (six feet eight inches). The above-noted compact physical dimensions of outer enclosure 106 enables mobile generator set 102 to be legally transported on most public highways of North America. To reduce wind drag during towing, the forward end 109 of outer enclosure 106 is preferably reclined about 20 degrees from vertical, as shown. Alternately preferably, generator set 102 is accommodated within a standard ISO-type shipping container for intermodal transport, as illustrated in FIG. 15.

Excluding fuel, mobile generator set 102 comprises a preferred towing weight of about 7,200 kilograms (15,850 pounds). This allows mobile generator set 102 to be towed by a standard one-ton pickup truck operated by a non-commercial driver.

Figure 5A:
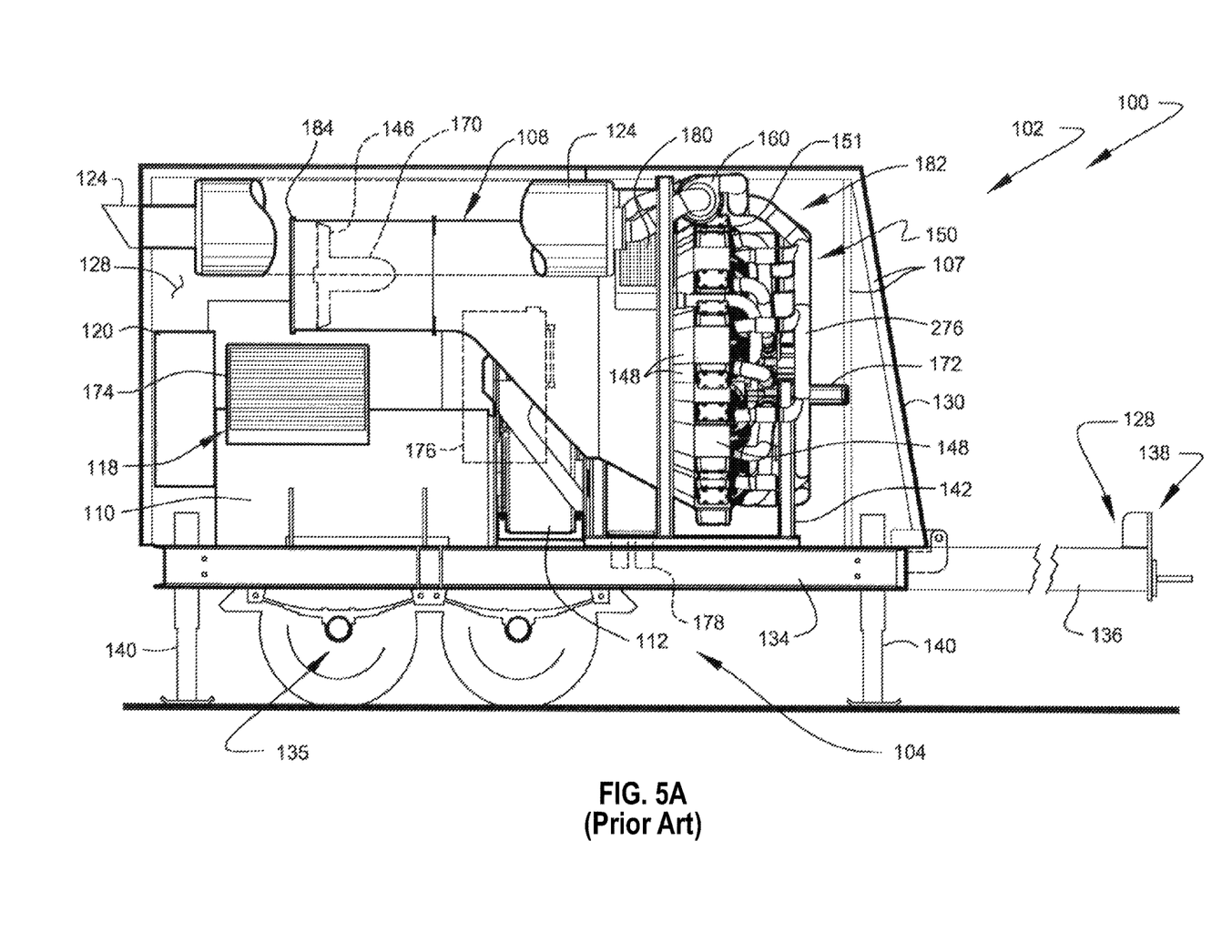
FIG. 5A is a section view through the line 5A-5A of FIG. 3 illustrating preferred internal arrangements of the mobile generator system of FIG. 1 in accordance with various embodiments.
Figure 5B:
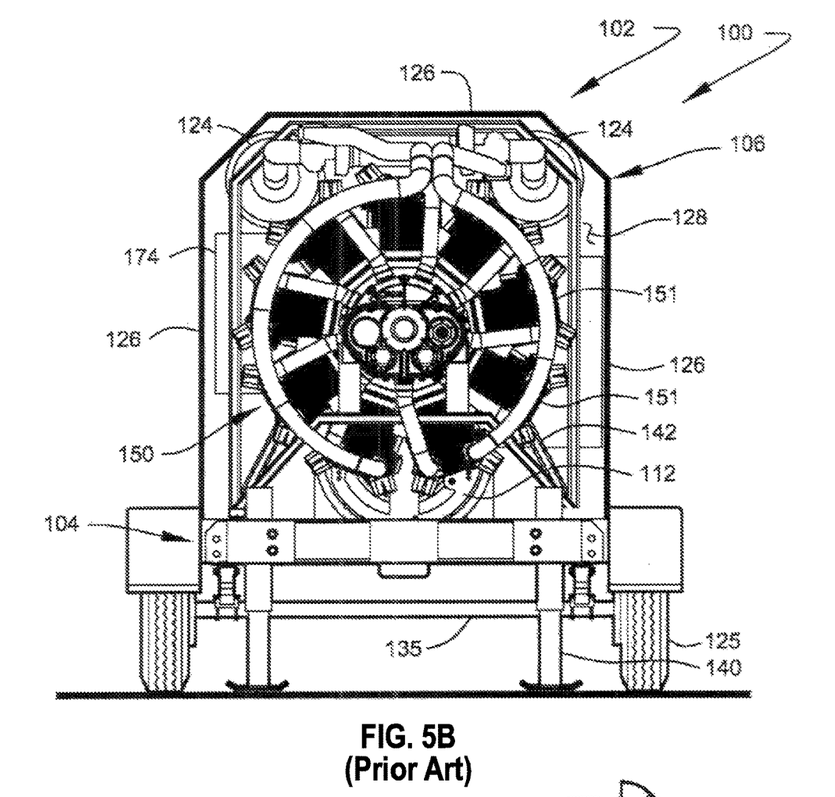
FIG. 5B is a section view through the line 5B-5B of FIG. 3 further illustrating preferred internal arrangements of the mobile generator system of FIG. 1 in accordance with various embodiments.

FIG. 5A shows a sectional view through the section 5A-5A of FIG. 3 illustrating preferred internal arrangements of mobile generator set 102 of FIG. 1. FIG. 5B shows a sectional view through the section 5B-5B of FIG. 3 further illustrating preferred internal arrangements of mobile generator set 102.

Figure 7:
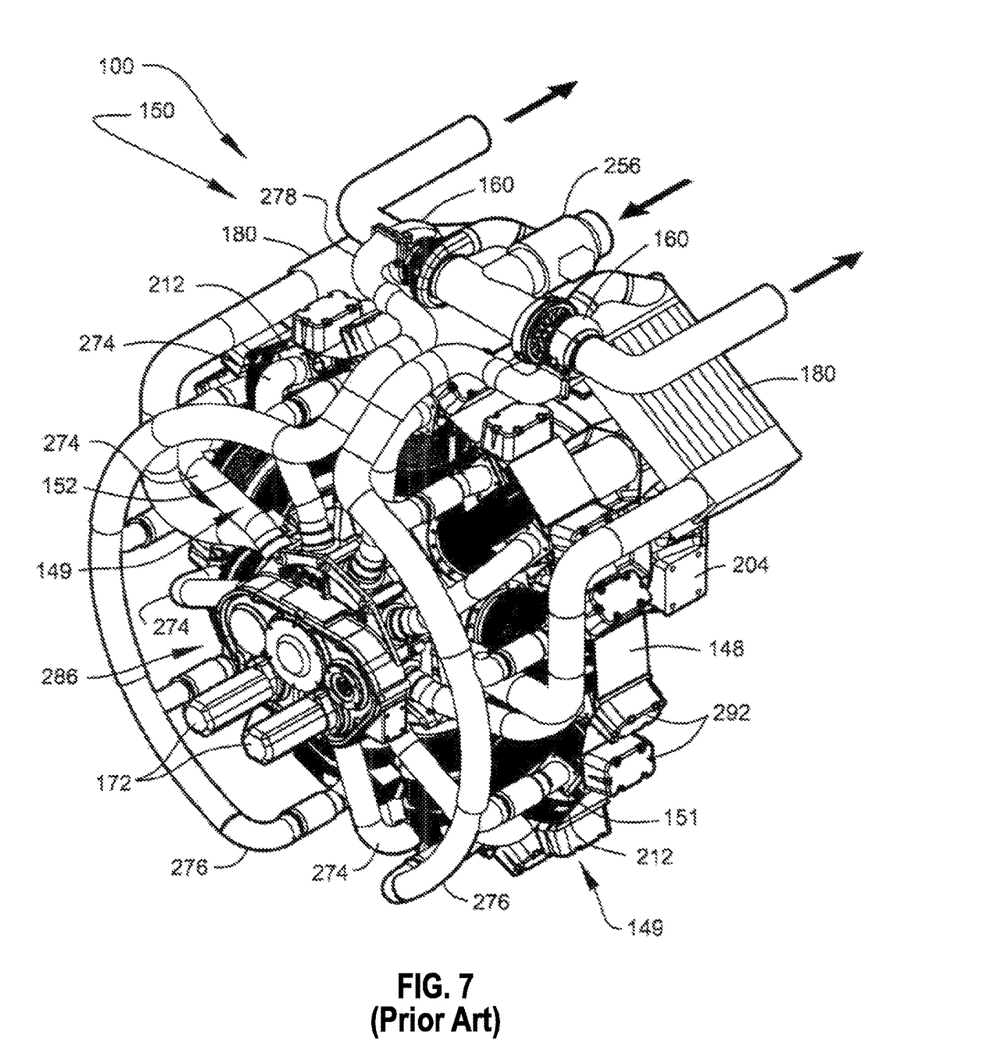
FIG. 7 is a first perspective view, illustrating a radial power plant structured and arranged to function as the prime mover for the mobile generator set FIG. 1 in accordance with various embodiments.

Radial power-generation unit 150 is supported from the forward portion of structural frame 134 by a vibration-isolating engine cradle 142, as shown. Engine cradle 142 is preferably coupled to mounting points located at both the forward end and aft end of radial power-generation unit 150 and preferably functions to transfer vertical loads, such as the weight of the engine, in addition to torque loads generated by the engine during operation. Within the present disclosure, the term aft or rear, shall be understood to indicate the power output side of the engine (as illustrated in FIG. 7B), with the term forward or front indicating the opposing side (as illustrated in FIG. 7). Engine cradle 142 preferably comprises a welded assembly of steel channels supported from tube steel base members. Engine cradle 142 is preferably isolated from the supporting structural frame 134 by cylindrical elastomeric vibration isolators 111, as shown.

Electrical generator 110 is preferably located aft of radial power-generation unit 150 at an elevation below the power output axis 144 power-generation unit 150 (see also FIG. 6). This preferred arrangement lowers the overall center of gravity of the embodiment and permits the rotational power output of radial power-generation unit 150 to be transferred to electrical generator no through torque-transmission unit 112 located between electrical generator no and radial power-generation unit 150, as shown. An onboard electrical control subsystem 120, which preferably monitors and controls both engine performance and generator output, is preferably housed in a cabinet positioned aft of electrical generator no, as shown.

Primary engine cooling for radial power-generation unit 15o is preferably provided by a coolant distribution system described below in conjunction with FIGS. 8-15. Alternatively, a hybrid system using liquid coolant coupled with air flow may be employed.

Secondary cooling of radial power-generation unit 150 may be provided by oil lubrication and filtration subsystem 118. Oil lubrication and filtration subsystem 118 preferably comprises remotely-mounted full-flow oil filters 178, oil cooler 174, and oil reservoir 176, as shown. Each component of oil filtration subsystem 118 is preferably coupled by a set of oil distribution lines (not shown) enabling fluid communication with an engine-driven oil circulation pump 172 of radial power-generation unit iso. Oil filtration subsystem 118 preferably functions as an extension of the general engine oiling system of radial power-generation unit 15o, which preferably includes pressure and scavenging pumps, oil distribution lines, etc. Oil cooler 174 preferably comprises active cooling preferably provided by at least one motorized fan operated by a 12-volt or 24-volt direct current (DC) source and/or a liquid coolant to oil heat exchanger.

Engine exhaust is preferably discharged through two exhaust silencers 124, preferably positioned in the upper portion of the internal volume 128 of outer housing 106, preferably flanking each side of discharge section 184, as shown. Each exhaust silencer 124 functions to reduce the decibel sound output of mobile generator set 102 during operation and to reduce NOX emissions. Each exhaust silencer 124 preferably discharges at a point external of outer housing 106, as shown.

Figure 6:
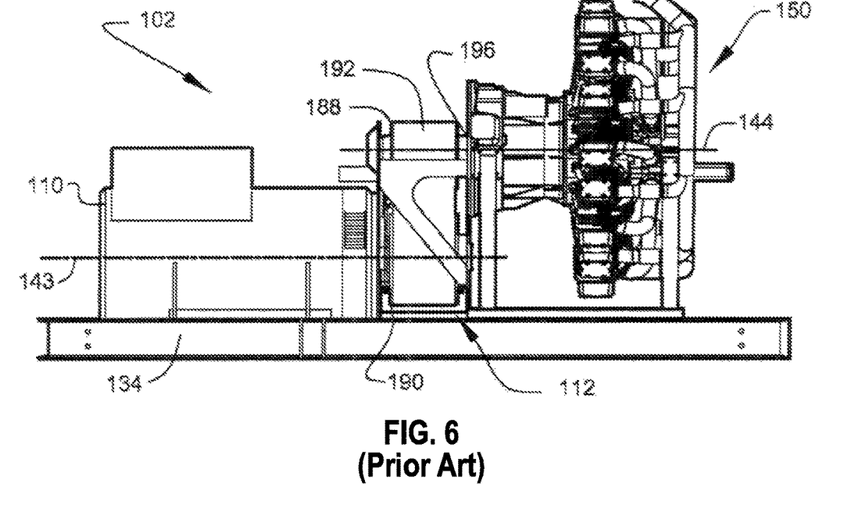
FIG. 6 is a side view illustrating a preferred arrangement of principal operating components of the mobile generator system of FIG. 1 in accordance with various embodiments.

FIG. 6 shows a side view illustrating a preferred arrangement of principal operating components of mobile generator set 102, according to the preferred embodiment of FIG. 1. It is noted that outer housing 106, fan ducting 108, exhaust silencers 124, oil filtration subsystem 118, and similar secondary components have been omitted from the illustration of FIG. 6 to assist in describing the preferred relationship between electrical generator no and radial power-generation unit 150.

The rotational power output of radial power-generation unit 150 is preferably transferred to the internal armature of electrical generator no through torque-transmission unit 112 located between electrical generator no and radial power-generation unit 150, as shown. Alternatively, the generator may be driven by the engine through a reduction gearbox which utilizes a single or multiple (e.g., dual) flywheels and flex couplings.

Generator no preferably comprises a four pole synchronous generator with a rated capacity of about 1200 kW, at an operational speed of about 1800 RPM (with an over-speed capacity of about 2250 RPM). Generator 110 preferably outputs three-phase 480-volt alternating current (AC). Generator 110 preferably comprises an approximate weight of about 2500 kilograms (about 5,000 pounds). A preferred generator unit suitable for use as generator no includes model MJB-400_MB4 supplied by Marelli Motori of Arzignano (VI) Italy.

Specific reference is now made to the preferred structures and arrangements of radial power-generation unit 150. FIG. 7 shows a perspective view, illustrating the overall external arrangement of radial power-generation unit 150. FIG. 7B shows a second perspective view illustrating the power output side of radial power-generation unit 150.

The successful development of the present highly-portable megawatt-class electric generator set required a prime mover exhibiting a low weight-per-horsepower ratio, compact size, and good in-service durability. During development of portable energy generation system 100, applicant determined that a suitable prime mover would require a sustainable power output of about 1,400 brake horsepower and, to facilitate over-the-road portability, a maximum physical width of less than about 2.4 meters (96 inches).

During the development process, applicant identified several possible engine configurations having the necessary physical and performance characteristics. After substantial research and analysis, applicant determined that only a radial-type piston engine afforded the above-noted characteristics, with the additional benefits of proven in-service durability, multi-fuel capability, and relatively low initial production cost.

The preferred design of radial power-generation unit 150 is generally derived from at least one aircraft application. The preferred adapting of a radial aircraft engine for use as radial power-generation unit 150 provides a prime mover capable of sustained high-power output, high operational reliability, and excellent efficiency.

In general, radial power-generation unit 150 comprises a reciprocating-piston engine of radial design, so called due to its radial arrangement cylinders about a central crankshaft. The preferred number of cylinders within radial power-generation unit 150 is odd, most preferably nine. Radial power-generation unit 150 preferably comprises a four-stroke piston engine generally derived from the Curtiss-Wright model R-1820 "Cyclone" radial engine developed and used during the 20th Century. The Curtiss-Wright R-1820 and its derivatives have powered numerous propeller-driven aircraft including helicopters. When properly maintained, the basic R-1820 design was demonstrated to be both reliable and relatively durable in aviation service. Developmental embodiments of mobile generator set 102 where successfully operated using a modified (turbocharged) R-1820-84 unit sourced from a Sikorsky Aircraft Corporation helicopter.

The usefulness of the R-1820 engine in non-aviation applications is severely hindered by the burdensome service intervals and relatively costly maintenance requirements of the power plant. The pure aviation radial engine, although compact and powerful, is especially ill-suited to industrial applications typically served by conventional industrial engines having relatively long service intervals.

Although the basic geometry of power-generation unit 150 is generally derived from the Curtiss-Wright engine, essentially the entire engine is preferably refitted for industrial service and increased performance. This preferably includes strengthening and replacement of some of the engine components.

Figure 8:
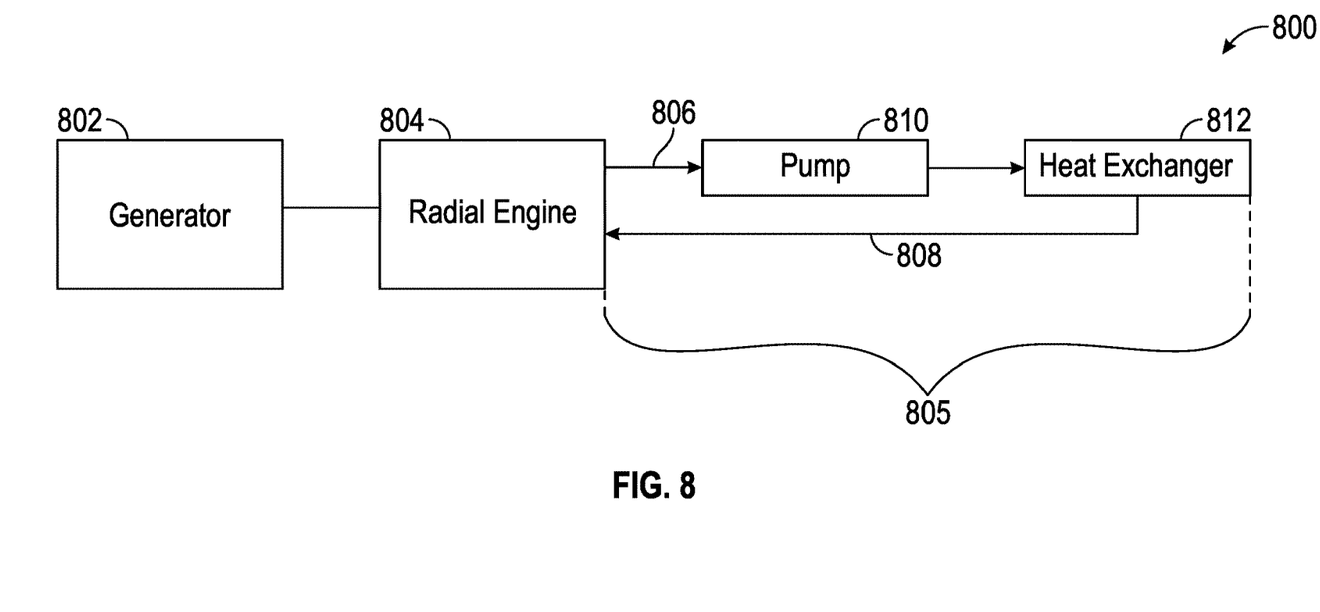
FIG. 8 is a schematic block diagram illustrating the functional components of a liquid cooling system for a radial engine for use with an electric power generator in accordance with various embodiments.

FIG. 8 is a power generation system 80o including a generator 802, a radial engine 804, and a liquid cooling system 805. The cooling system 805 includes a fluid outlet conduit (e.g., manifold) 806, a fluid pump 810, a heat exchanger 812 (e.g. radiator), and a fluid inlet conduit (e.g., manifold) 808.

Figure 9:
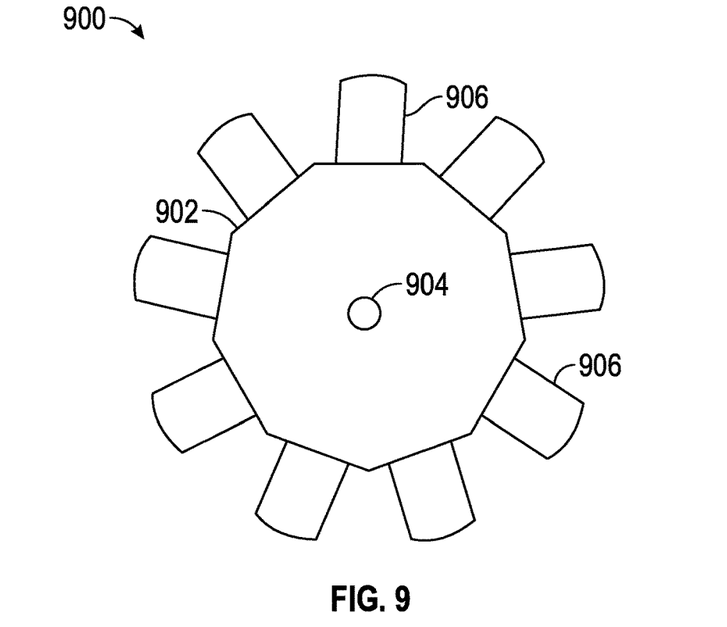
FIG. 9 is a schematic diagram of a radial engine showing an odd number (e.g., nine) of liquid cooled cylinders mounted to the outside of a central hub in accordance with various embodiments.

FIG. 9 is a schematic diagram of a radial engine showing an odd number (e.g., nine) of liquid cooled cylinders 906 mounted to and extending radially from a crankcase (central hub) 902 supporting a crankshaft 904.

Figure 10:
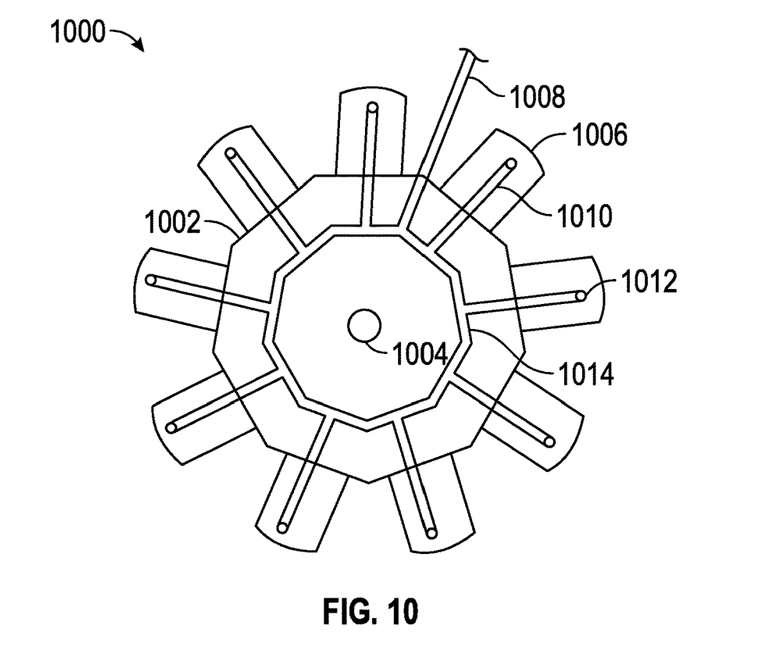
FIG. 10 is a schematic diagram of the radial engine of FIG. 9 showing a hub mounted fluid manifold in accordance with various embodiments.

FIG. 10 depicts a radial engine 1000 including a hub 1002 supporting a crankshaft 1004 and a plurality of cylinders 1006 extending therefrom. Each cylinder includes an exemplary inlet port 1012 and an outlet port (not shown for clarity). A manifold 1014 is shown mounted to the hub, including respective conduit segments (also referred to as conduit extensions) 1010 interconnecting each port 1012 to a main fluid inlet (or outlet) conduit 1008.

Figure 11:
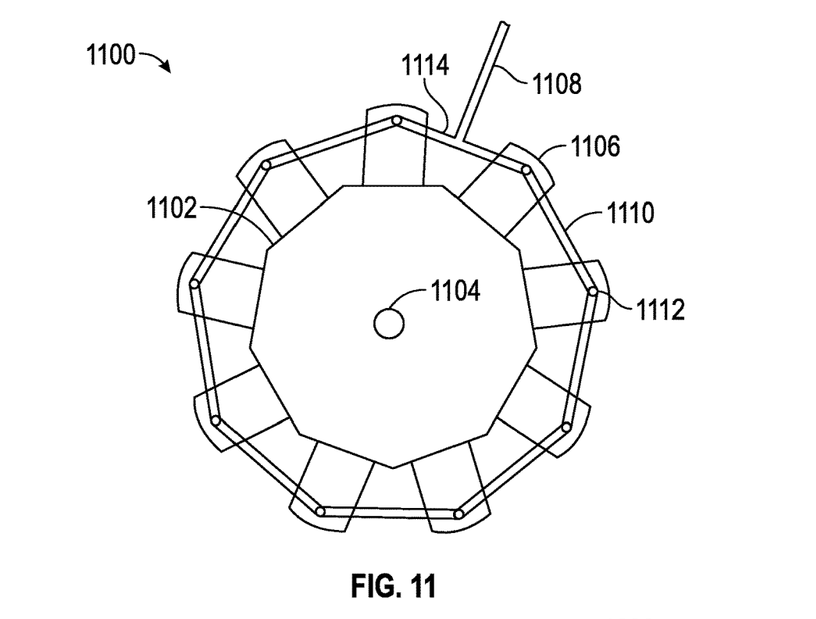
FIG. 11 is a schematic diagram of the radial engine of FIG. 9 showing the fluid manifold mounted to the cylinders in accordance with various embodiments.

FIG. 11 is an alternative embodiment of a radial engine 1100 including a hub 1102 supporting a crankshaft 1104 and a plurality of cylinders 1106 extending therefrom. Each cylinder includes an exemplary inlet port 1112 and an outlet port (not shown for clarity). A manifold 1114 is shown mounted external to the hub, for example, mounted to the various cylinders. Respective conduit segments 1110 interconnect each port 1112 to a main fluid conduit 1108.

Figure 12:
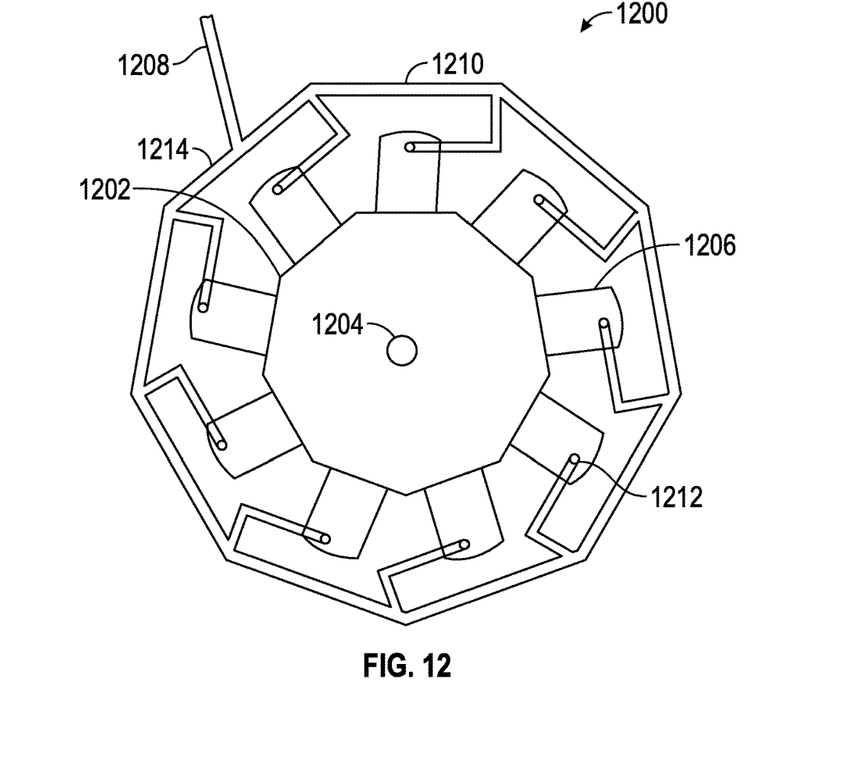
FIG. 12 is a schematic diagram of the radial engine of FIG. 9 showing the fluid manifold disposed external to the hub and cylinders in accordance with various embodiments.

FIG. 12 is a further alternative embodiment of a radial engine 1200 including a hub 1202 supporting a crankshaft 1204 and a plurality of cylinders 1206, each having an inlet port 1212. A manifold 1214 is mounted external to the hub and cylinders. Respective conduit segments 1210 interconnect each port 1212 to a main fluid conduit 1208.

Figure 13:
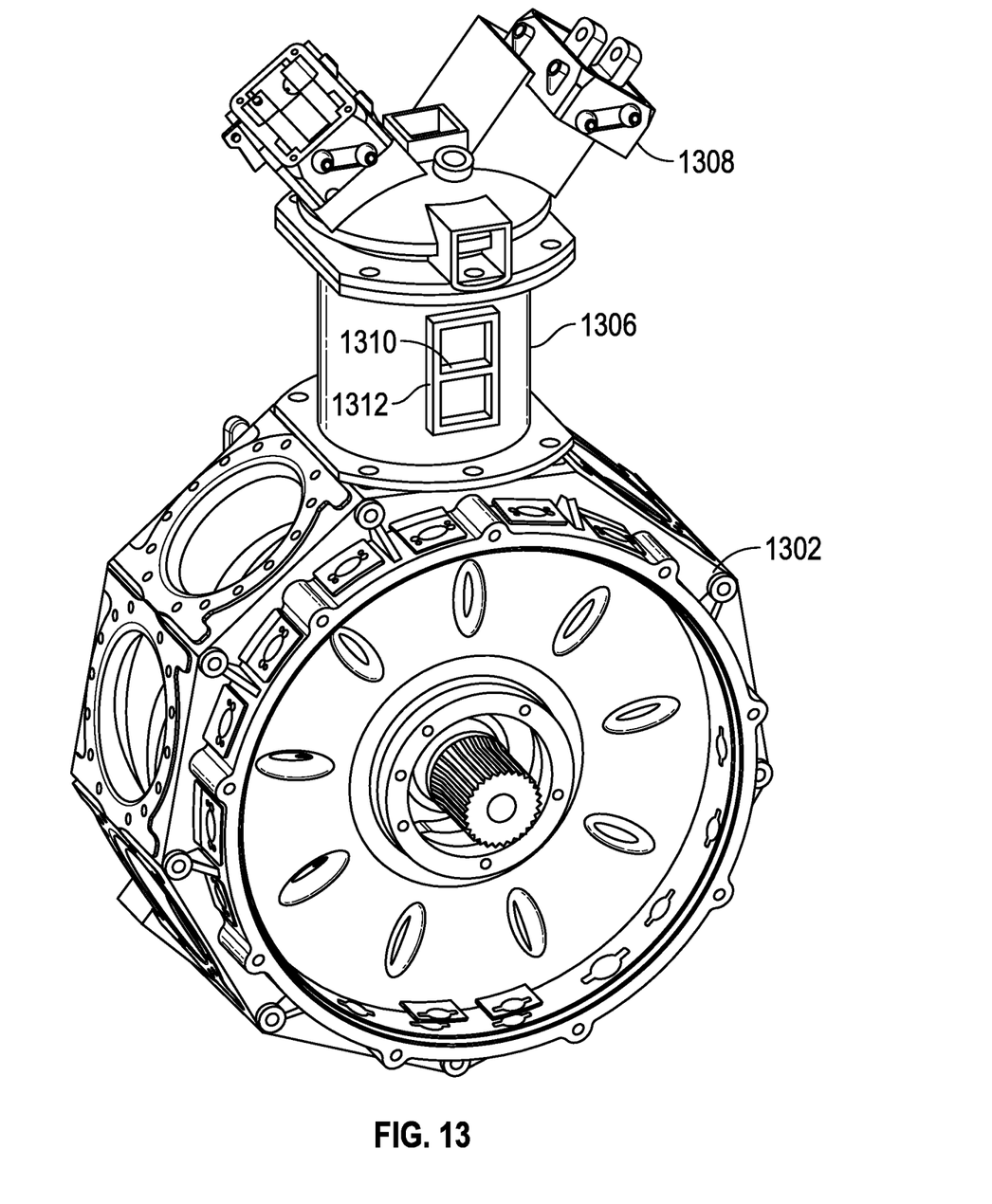
FIG. 13 is perspective view of a central hub illustrating a cylinder having a fluid inlet and a fluid outlet port in accordance with various embodiments.

FIG. 13 illustrates a central hub 1302 having a cylinder 1306 connected to a radial surface of the hub. The remaining cylinders are omitted for clarity. The cylinder 1306 includes an inlet fluid port 1310 and an outlet fluid port 1312. An exemplary cylinder head 1308 is attached to the cylinder body 1306, as described in greater detail below in connection with FIGS. 14-16.

Figure 14:
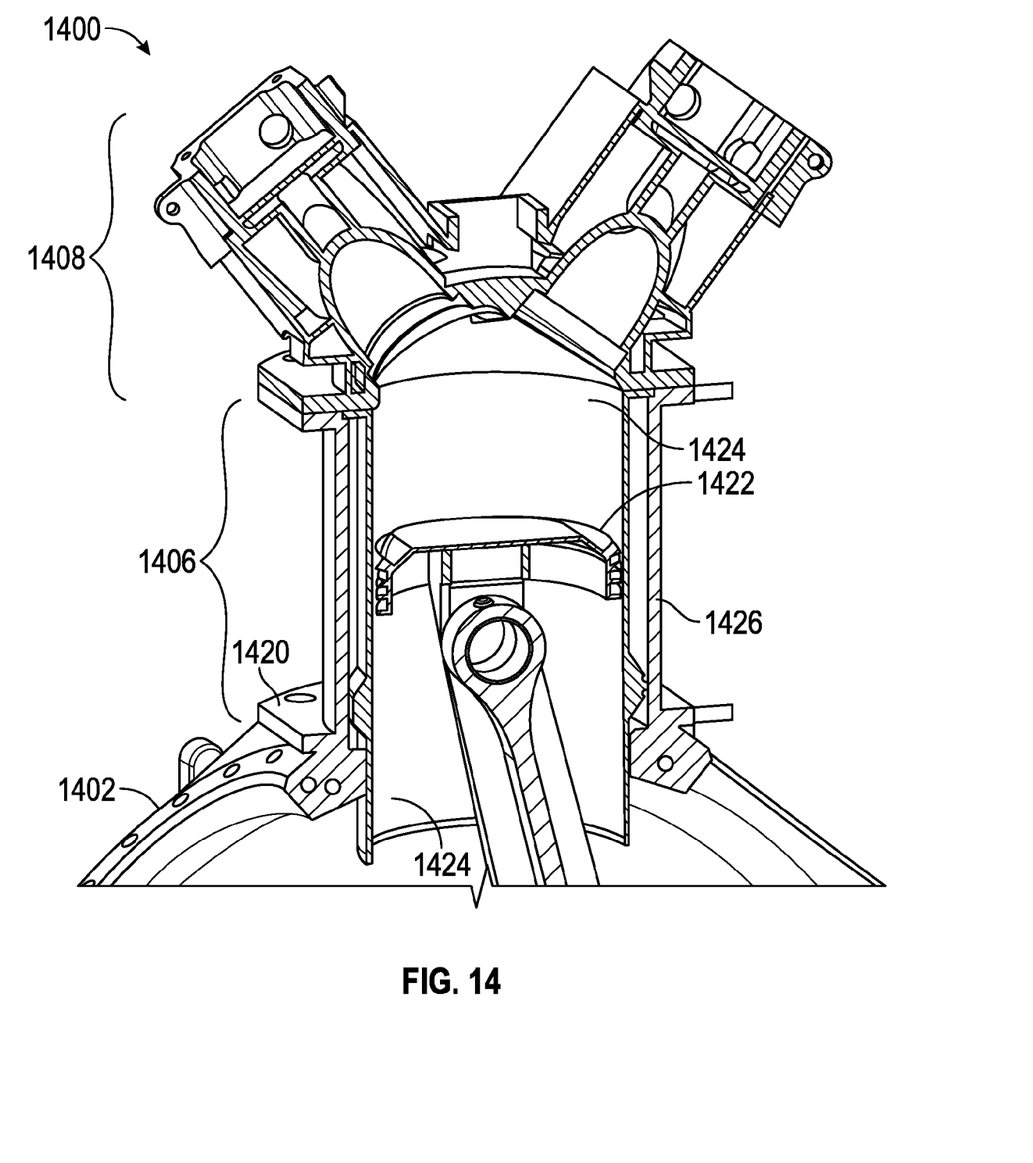
FIG. 14 is a cut-away view of the cylinder of FIG. 13 in accordance with various embodiments.

FIG. 14 is a cut-away view of cooling fluid porting and jacket configuration including a cylinder 1406 mounted to a hub 142 using a bracket 1420. A connecting rod 1424 connects a piston 1422 to the crankshaft. A cylinder head 1408 is connected to the cylinder 1406. The cylinder 1406 comprises an inner sleeve 1424 and an outer jacket 1426, as detailed below in conjunction with FIG. 15.

FIG. 15 is a close up view of the inside of the cylinder of FIG. 14, illustrating a flanged sleeve held in place by the cylinder head in accordance with various embodiments. More particularly, a cylinder assembly 1500 includes an inner sleeve 1535 extending radially from the hub and terminating at a flange 1536. The inner sleeve 1535 further includes a raised portion 1524 supporting an o-ring 1525.

The cylinder assembly 1500 also includes an outer jacket 1526 defining a fluid path 1522 between the outer jacket and the inner sleeve. The o-ring 1525 and the flange 1536 also define the boundaries of the fluid path. With momentary reference to FIG. 13, the fluid path 1522 communicates with the inlet port 1310 and outlet port 1312 to maintain fluid flow through the fluid path 1522.

With continued reference to FIG. 15, a cylinder head 1508 may also include a fluid path 1530, with associated fluid inlet and outlet ports (not shown). The jacket 1526 includes a step 1537 upon which the flange 1536 abuts. The cylinder head 1508 includes a plate 1532. In the assembled position shown in FIG. 15, the plate 1520 is bolted to the hub, and the cylinder head 1508 is bolted to the outer jacket 1526, such that the flange 1536 is sandwiched between the step 1537 and the plate 1532. This facilitates easy access to the pistons and connecting rods for repair and maintenance, in that only a single piston assembly is required to be removed in order to access the internal components.

A ground-based (e.g., stationary and/or mobile) electric power generating system is thus provided. The system includes a generator coupled to a radial engine of the type including a central hub and a plurality of radially extending cylinder assemblies. Each cylinder assembly includes: an inner sleeve having a top flange; an outer jacket having a horizontal step; a fluid path defined between the inner sleeve and the outer jacket; and a cylinder head having a horizontal plate; wherein the flange is clamped between the step and the plate to thereby secure the inner sleeve within the cylinder assembly.

In an embodiment, the fluid path is configured to communicate with a fluid inlet port and a fluid outlet port.

In an embodiment, the system further includes a fluid inlet manifold coupled to the fluid inlet port, and a fluid outlet manifold coupled to the fluid inlet port.

In an embodiment, the fluid inlet manifold is secured to the hub.

In another embodiment, the fluid inlet manifold is secured to the plurality of cylinder assemblies.

In yet a further embodiment, the fluid inlet manifold is secured to the system external to the hub and the cylinders.

In an embodiment, the radial engine is configured for steady state operation in the range of about 2300 RPM.

A ground-based portable electric power generating system is also provided which employs a radial engine including: a plurality of cylinders extending radially from a central hub supporting a crankshaft, each cylinder having a coolant inlet port and a coolant outlet port; and an inlet coolant manifold interconnecting at least two of the coolant inlet ports; wherein the inlet coolant manifold is disposed external to the central hub.

In an embodiment, the system further includes an outlet coolant manifold interconnecting at least two of the coolant outlet ports, wherein the outlet coolant manifold is disposed external to the hub.

In an embodiment, the central hub comprises a single casting, and the inlet and outlet coolant manifolds are external to the hub.

In an embodiment, the inlet manifold comprises respective inlet conduit extensions each connected to a unique inlet port.

In an embodiment, the outlet manifold comprises respective outlet conduit extensions each connected to a unique outlet port.

In an embodiment, at least one of the inlet manifold and the outlet manifolds is mounted to the central hub.

In an embodiment, at least one of the inlet manifold and the outlet manifold is mounted to the plurality of cylinders.

In an embodiment, the system further includes a fluid pump and a heat exchanger, each in fluidic communication with the inlet manifold and the outlet manifold.

In an embodiment, each of the plurality of cylinders includes: an inner sleeve having a top flange; an outer jacket having a horizontal step; a fluid path defined between the inner sleeve and the outer jacket; and a cylinder head having a horizontal plate; wherein the flange is clamped between the step and the plate to thereby secure the inner sleeve within the cylinder assembly.

In an embodiment, the cylinder head includes a second fluid inlet port and a second fluid outlet port communicating with a second fluid path within the cylinder head.

A portable system for generating electric power is also provided. The system includes: an electric generator; a radial engine having a crankshaft coupled to the electric generator and a plurality of cylinders extending radially from a central hub; a towable wheeled chassis supporting the electric generator and the radial engine; and a fluid cooling system comprising an inlet manifold configured to supply coolant to each of the plurality of cylinders, and an outlet manifold configured to exhaust coolant from each of the plurality of cylinders; wherein the inlet manifold and the outlet manifold are external to the central hub.

In an embodiment, at least one of the inlet manifold and the outlet manifold are mounted to the hub.

In another embodiment, at least one of the inlet manifold and the outlet manifold are mounted to the plurality of cylinders It should be noted that the various inventions described herein, while illustrated in the context of a nine cylinder engine, are not so limited. Those skilled in the art will appreciate that the systems and methods described herein may contemplate any number of cylinders.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:

1. A ground-based electric power generating system, comprising:
   a generator coupled to a radial engine of the type including a central hub and a plurality of radially extending cylinder assemblies, each cylinder assembly comprising:
   an inner sleeve having a top flange, wherein the inner sleeve is configured to provide a path for a reciprocating piston;
   an outer jacket having a cylindrical jacket wall terminating at a horizontal step, a fluid inlet port extending through the cylindrical jacket wall, and a fluid outlet port extending through the cylindrical jacket wall;
   a fluid path defined between the inner sleeve and the cylindrical jacket wall of the outer jacket; and
   a cylinder head having a horizontal plate;
   wherein the top flange is clamped between the horizontal step and the horizontal plate to thereby secure the inner sleeve within the cylinder assembly;
   wherein the fluid inlet port is configured to communicate cooling fluid to the fluid path from a fluid inlet manifold disposed external to the cylinder assemblies;
   wherein the fluid outlet port is configured to communicate cooling fluid from the fluid path to a fluid outlet manifold disposed external to the cylinder assemblies;
   wherein the fluid inlet manifold is a regular, nine-sided polygonal structure having rotational symmetry about an axis defined by a crankshaft of the radial engine wherein each vertex of the polygonal structure is coupled to a corresponding inlet port of the cylinder assemblies.

2. The system of claim 1, wherein the fluid inlet manifold is secured to the central hub.

3. The system of claim 1, wherein the fluid inlet manifold is secured to the plurality of radially extending cylinder assemblies.

4. The system of claim 1, wherein the fluid inlet manifold is secured to the system external to the central hub and the radially extending cylinder assemblies.

5. The system of claim 1, wherein the radial engine is configured for steady state operation in the range of 2300 RPM.

6. A portable system for generating electric power, comprising:
   an electric generator;
   a radial engine having a crankshaft coupled to the electric generator and a plurality of cylinders extending radially from a central hub, each cylinder comprising an inner sleeve, an outer cylindrical jacket, an inlet port extending through the outer cylindrical jacket, an outlet port extending through the outer cylindrical jacket, wherein the inner sleeve is configured to provide a path for a reciprocating piston;
   a towable wheeled chassis supporting the electric generator and the radial engine; and
   a fluid cooling system comprising an inlet manifold configured to supply coolant to each of the plurality of inlet ports, and an outlet manifold configured to exhaust coolant from each of the plurality of outlet ports;
   wherein the inlet manifold and the outlet manifold are external to the central hub, and the inlet manifold is a regular, nine-sided polygonal structure having rotational symmetry about an axis defined by a crankshaft of the radial engine wherein each vertex of the polygonal structure is coupled to a corresponding inlet port of the cylinder assemblies.

7. The system of claim 6, wherein at least one of the inlet manifold and the outlet manifold are mounted to the central hub.

8. The system of claim 6, wherein at least one of the inlet manifold and the outlet manifold are mounted to the plurality of cylinders.

* * * * *